United States Patent [19]

Kawamura et al.

[11] Patent Number: 5,357,302
[45] Date of Patent: Oct. 18, 1994

[54] APPARATUS FOR FEEDING PHOTOGRAPHIC FILM HAVING TWO PERFORATIONS PER FRAME

[75] Inventors: Kunio Kawamura, Kawachinagano; Yasuo Hawai, Higashiosaka; Sadafusa Tsuji, Tondabayashi; Shuji Izumi, Sakai; Masaaki Chikasaki, Toyonaka; Michihiro Iwata; Hiroyuki Okada, both of Sakai, all of Japan

[73] Assignee: Minolta Camera Kabushiki Kaisha, Osaka, Japan

[21] Appl. No.: 814,826

[22] Filed: Dec. 31, 1991

[30] Foreign Application Priority Data

Jan. 4, 1991 [JP] Japan .................................. 3-000030
Jan. 4, 1991 [JP] Japan .................................. 3-000031
Jan. 4, 1991 [JP] Japan .................................. 3-000032

[51] Int. Cl.⁵ .................................................. G03B 1/22
[52] U.S. Cl. .................................................. 354/213
[58] Field of Search ............... 354/173.1, 173.11, 213, 354/212

[56] References Cited

U.S. PATENT DOCUMENTS

Re. 31,516  2/1984  Tanaka ........................... 354/213 X
3,665,830   5/1972  Maeda ............................. 354/213
3,852,792  12/1974  Nikitsch et al. ................. 354/213
4,221,478   9/1980  Karikawa ......................... 354/213
4,236,800  12/1980  Satoh ............................. 354/213
4,903,061   2/1990  Harvey ........................... 354/213
4,914,462   4/1990  Pagano ........................... 354/213
4,980,710  12/1990  Harvey .......................... 354/173.1
5,023,640   6/1991  Diehl ........................... 354/173.1

Primary Examiner—Michael L. Gellner
Assistant Examiner—J. K. Han
Attorney, Agent, or Firm—Burns, Doane, Swecker & Mathis

[57] ABSTRACT

A film feeding apparatus of a camera using a film having two perforations in each frame. A perforation detecting lever has claws spaced at a predetermined distance apart from each other so that the distance therebetween is equal to the distance between the two perforations which are adjacent to each other across the boundary between frames. The perforation detecting lever engages the perforations and disengages therefrom in unison with an operation for feeding one frame to be performed after the proceeding frame is exposed to light. As a result, film feeding is allowed to proceed until both claws simultaneously engage two respective perforations in the film which occurs after the film has advanced one frame.

12 Claims, 15 Drawing Sheets

APPARATUS FOR FEEDING PHOTOGRAPHIC FILM HAVING TWO PERFORATIONS PER FRAME

BACKGROUND OF THE INVENTION

1. Field of the Invention

The present invention relates to a film feeding apparatus of a camera and more particularly to the construction of the mechanism for stopping the feeding of the film each time one frame of the film is fed.

The present invention also relates to a film feeding apparatus of a camera having an automatic initial loading function for feeding out the film from a cartridge after the cartridge is installed in a cartridge chamber of the camera and winding the film round a spool provided in the camera.

2. Description of the Related Arts

Normally, the film feeding apparatus of a camera automatically stops the operation for feeding the film each time the film is fed by one frame, by utilizing perforations formed in the film. In a camera using an ordinary 35 mm film having perforations formed therein at small regular intervals, the film feeding is stopped when the rotational angle of a sprocket engaging perforations reaches a predetermined value. For example, a camera for use with 110 type film having one perforation formed in each frame at regular intervals has a mechanism comprising a perforation detecting lever having a claw which penetrates into each perforation and a spring for urging the lever in the direction in which the claw presses against the film surface. In this mechanism, the claw penetrates into one perforation and engages with it while the film is being fed. Thus, the film is prevented from moving. In using the film having one perforation formed for each frame, the mechanism for stopping the feeding of the film by means of the lever can be constructed comparatively easily.

In the meantime, the present applicant proposed a camera which uses a film having two perforations formed in one frame in Japanese Patent Application 2-092579. If the lever mechanism of the camera for use with 110 type film is applied in the camera using film having two perforations formed for one frame, it is difficult to distinguish whether the claw of the lever has penetrated into the front perforation or the rear perforation in each frame, which causes the control system and the construction of the camera to be complicated.

In using film having two perforations formed for one frame, it is considered that the claw of the lever is allowed to penetrate into only the front perforation. More specifically, the lever is interlocked with a shutter charging mechanism so as to move the lever away from the film surface when the rear perforation passes the position corresponding to the claw of the lever. However, a mechanism in which the operation timing of the lever is controlled by interlocking the lever mechanism with a different mechanism leads to a limitation in designing or assembling the camera. In addition, if the lever is operated at an inappropriate time, the control for winding the film cannot be appropriately accomplished. These problems may occur when one frame has more than two perforations.

The following initial loading function is known. That is, a film is automatically fed out from a film cartridge after a user installs it in a cartridge chamber of a camera and the film is automatically wound round a spool of the camera. In this initial loading mechanism, when the film fed out from the cartridge advances toward the spool, the film is prevented from proceeding if there is an obstacle on the film feeding path. In the mechanism of the camera for use with 110 type film, the lever described above is urged so that the claw presses against the film surface. That is, if the lever mechanism of the camera for use 110 type film is employed in a camera having the initial loading mechanism, the claw of the lever prevents the feeding of the film during the initial loading operation.

In order to adopt a mechanism equivalent to the lever mechanism of the camera for use 110 type film in the camera having the initial loading mechanism, it is necessary in initial loading to move the claw of the perforation detecting lever away from the film feeding path by interlocking the operation of the perforation detecting lever with that of the film feeding mechanism or by a user's manual operation. However, in the former, the construction of the film feeding apparatus and the control system thereof because complicated. In the latter, it is necessary for the user to perform an operation, which may lead to an operation mistake.

SUMMARY OF THE INVENTION

It is an object of the present invention to provide a film feeding apparatus having a perforation detecting lever mechanism that is simple in its construction and capable reliable control in feeding the film by each frame having a plurality of perforations.

It is another object of the present invention to provide the film feeding apparatus having the perforation detecting lever mechanism which comprises a mechanism, simple in its construction, for reliably moving the claw of the lever away from the film feeding path in initial loading of the film so that a user has no manual operation.

In accomplishing these and other objects, according to an embodiment of the present invention, there is provided a film feeding apparatus of a camera using a film having two perforations each formed at a predetermined position of a frame in correspondence with the exposure plane of each frame, an interval in a frame between a first perforation and a second perforation being different from an interval between the second perforation of the frame and a first perforation of a succeeding frame, the film feeding apparatus comprising: a first claw capable of engaging the first perforation; a second claw capable of engaging the second perforation; supporting means for supporting the first and second claws so that the first and second claws are movable between an operating position at which the first and second claws are capable of engaging the first and second perforations respectively and a move-away position spaced at a predetermined interval from the operating position; feeding means for feeding the film; stopping means for preventing the feeding means from feeding the film by detecting that the film has been fed by one frame due to an engagement of the first claw with the first perforation and that of the second claw with the second perforation; moving means for moving the supporting means to the move-away position when the feeding of the film starts as a result of the exposure of each frame; urging means for urging the first and second claws to the operating position except when the moving means operates; and engagement preventing means for preventing the second claw from engaging the first or second perforation when the first claw is not in engagement with the first perforation so as to prevent the second claw from erroneously engaging the first perforation after the moving means moves the supporting means to the move-away position.

According to the film feeding apparatus of the above construction, when the second perforation of a frame is at the position of the first claw while the film is being fed, the first claw does not engage the second perforation because the second claw is in contact with the film surface of the frame. Accordingly, the film continues to advance. When the second perforation of the frame is at the position of the second claw, the first perforation of the next frame coincides with the first claw, thus engaging the first perforation and the second claw coincides with the second perforation, thus engaging the second perforation. Even though the first perforation of the next frame is at the position of the second claw which thus penetrates thereinto, the detecting lever disengages from the first perforation because the engagement preventing means prevents the second claw from engaging the first perforation. Thus, the film is permitted to keep moving.

As described above, the apparatus is capable of feeding the film having two perforations in one frame as easily as a camera for use with 110 type film does.

According to another embodiment of the present invention, a film feeding apparatus of a camera using a film accommodated in a cartridge and having perforations along an edge thereof comprises: a claw capable of engaging the perforations; supporting means for supporting the claw so that the claw is movable between an operating position at which the claw is capable of engaging the perforations and a move-away position spaced at a predetermined interval from the operating position; feeding means for feeding the film; stopping means for preventing the feeding means from feeding the film due to the engagement of the claw with the perforation; a spool around which the film fed out from the cartridge is wound; detecting means for detecting that the leading end of the film has reached the spool; moving means for, in an initial loading of the film, moving the claw to the move-away position by means of the supporting means when the detecting means does not detect the arrival of the leading end of the film at the spool and moving the claw to the operating position by means of the supporting means when the detecting means has detected the arrival of the leading end of the film at the spool.

According to the apparatus of this embodiment, the moving means automatically moves the first and second claws away from the advance path of the film in an initial loading of the film. Therefore, if the apparatus of the present invention is applied to a camera having an initial loading mechanism, the initial loading of the film can be secured. In addition, it is unnecessary for a user to carry out any operation for loading the film.

According to still another embodiment of the present invention, a film feeding apparatus of a camera using a film having a first perforation and a second perforation positioned downstream of the first perforation with reference to an advance direction of the film in each frame, the interval between the first perforation and the second perforation of the frame is larger than the interval between the second perforation of the frame and a first perforation of a next frame, the film feeding apparatus comprises: a claw capable of engaging the second perforation; supporting means for supporting the claw so that the claw is movable between an operating position at which the claw is capable of engaging the second perforation and a move-away position spaced at a predetermined interval from the operating position; feeding means for feeding the film; stopping means for preventing the feeding means from feeding the film due to the engagement of the claw with the second perforation; moving means for moving the claw from the operating position to the move-away position before the feeding means starts feeding the film and moving the claw to the operating position between the time when the first perforation has passed the position of the claw and the time when the second perforation passes the position of the claw while the feeding means is feeding the film.

According to the above construction, the operation of the apparatus is timed to the shutter release operation and the operation of the spool for winding the film. Therefore, the structure which operates by utilizing an ordinary shutter plate and a charge gear secures the feeding of each frame of the film having two perforations in each frame.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
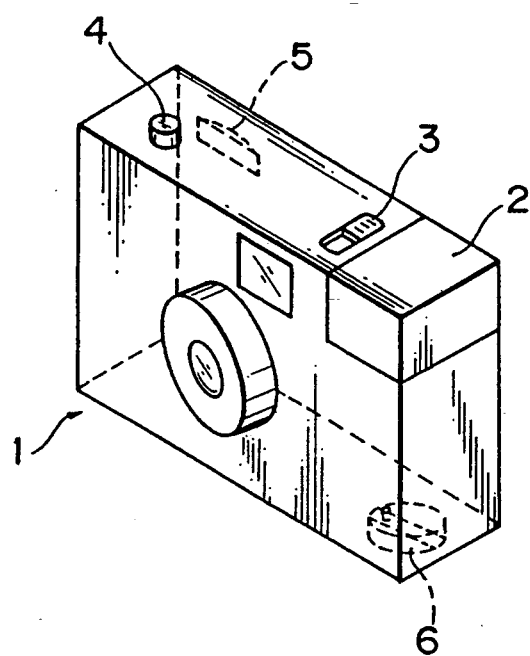
FIG. 1 is a schematic view showing the outer appearance of a camera having a film feeding apparatus according to a first embodiment of the present invention.

Before the description of the present invention proceeds, it is to be noted that like parts are designated by like reference numerals throughout the accompanying drawings.

A film feeding apparatus according to a first embodiment of the present invention will be described with reference to FIG. 1 through FIG. 17. A film to be used in the first embodiment has two perforations per frame.

Figure 2:
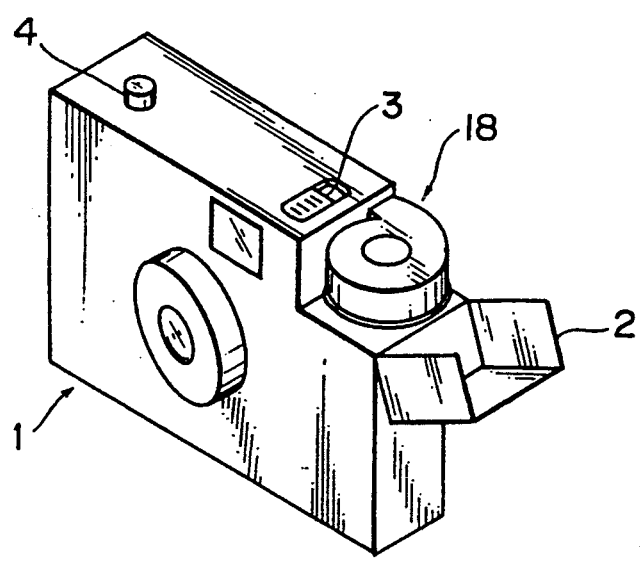
FIG. 2 is a perspective view showing the camera of FIG. 1 schematically with the cover of a cartridge chamber opened.

In a camera having a film feeding apparatus according to the first embodiment uses a cartridge 18 accommodating the film. A camera body 1 has a cover 2 as shown in FIGS. 1 and 2 in an upper portion thereof. The cover 2 is opened to install the cartridge 18 in the cartridge chamber and to remove to therefrom. A slide button 3 is operated to open the cover 2. The camera body 1 further comprises a release button 4, a film winding knob 5, and a film rewinding knob 6.

Figure 3:
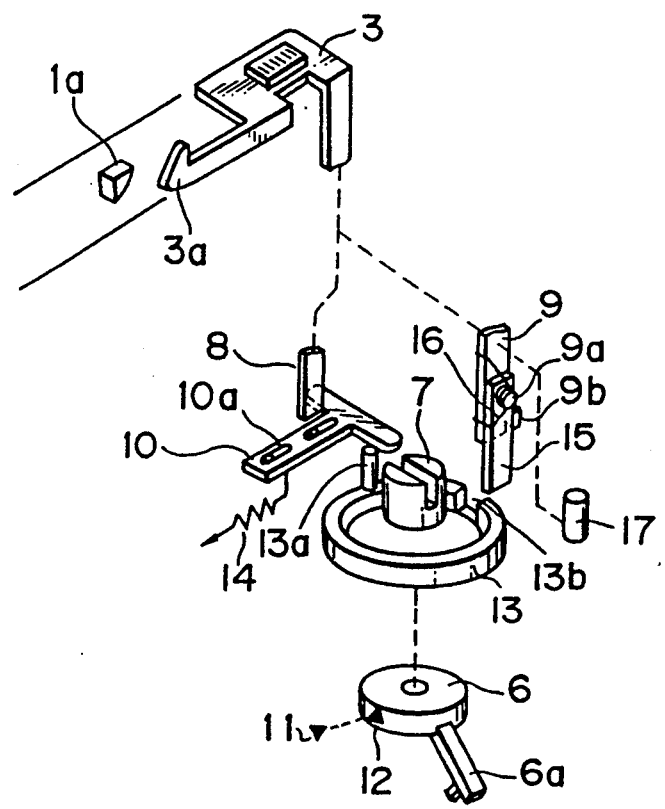
FIG. 3 is a perspective view showing a part of a film rewinding mechanism of the camera of FIG. 1.

FIG. 3 shows a part of a film rewinding mechanism for rewinding the film into the cartridge 18. The film rewinding knob 6 has a protrusible lever 6a and can be rotated by holding the lever 6a which has been protruded. A rewinding fork 7 rotates together with the rewinding knob 6, which in turn, rotates a spool (not shown) engaging the fork 7. Thus, the film can be rewound into the cartridge 18.

According to this film rewinding mechanism, the position (rotational angle) of the fork 7 is set so that the rotational angle of the spool at the time of the removal of the cartridge 18 from the cartridge chamber is different from that at the time of the installation of the cartridge 18 into the cartridge chamber. More specifically, two arms 8 and 9 are formed on the slide button 3 and the fork 7 is integrated with a control ring 13 having a pin 13a and a cut-out 13b formed thereon. Thus, only when the fork 7 is at a predetermined rotational angle, the cover 2 can be opened. When the fork 7 is at a rotational angle other than the predetermined rotational angle, the slide button 3 is locked. Thus, the cover 2 cannot be opened. A lever 10 is provided between arm 8 and the ring 13. The lever 10 serves as a means for resetting the position of the fork 7 to the rotational position corresponding to that of the spool of an unused cartridge 18 which will be installed into the cartridge chamber after a cartridge 18 used is removed therefrom. The lever 10 is T-shaped and urged toward the arm 8 by a spring 14 along a slot 10a. A lever 15 is rotatably mounted on a pin 9a provided at a lower end portion of the arm 9. The moving direction of the lever 15 is restricted by a stopper 9b and urged by a spring 16 attached to a pin 9a toward the direction in which the lever 15 contacts the stopper 9b. A claw 3a is formed at the leading end of the slide button 3 so as to keep the cover 2 locked at the opened position of the cover 2 brought about by operating the slide button 3. A projection 1a corresponding to the claw 3a is formed on the upper surface of the camera body 1. Indicators 11 and 12 are formed on the camera body 1 and the rewinding knob 6, respectively so as to lock the fork 7 at a predetermined rotational position when the film rewinding operation has been completed. A lock pin 17 interlocked with the operation of the slide button 3 is provided in the vicinity of the control ring 13. When the lock pin 17 is away from the cartridge 18, the rotation of the cartridge spool is restricted. When the lock pin 17 has been inserted into the cartridge 18, the rotation thereof is permitted.

Figure 4:
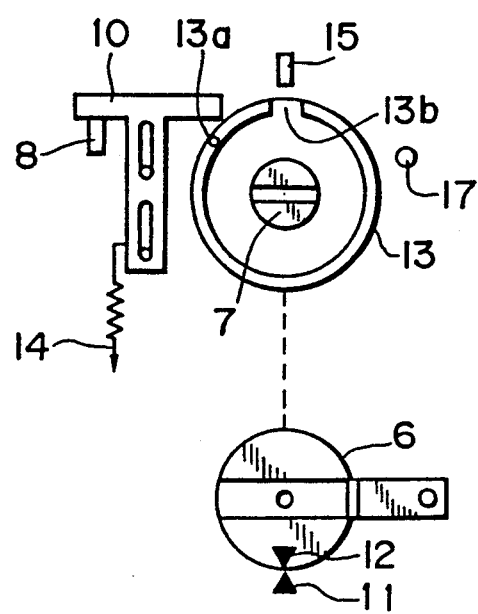
FIG. 4 is an explanatory view showing the operation state of the mechanism of FIG. 3 in which a film rewinding operation has been completed.
Figure 5:
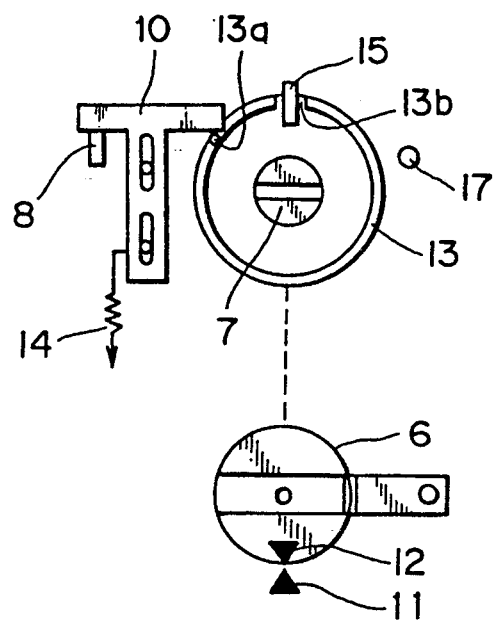
FIG. 5 is an explanatory view showing the operation state of the mechanism of FIG. 3 in which the cover of the cartridge chamber has been opened.
Figure 6:
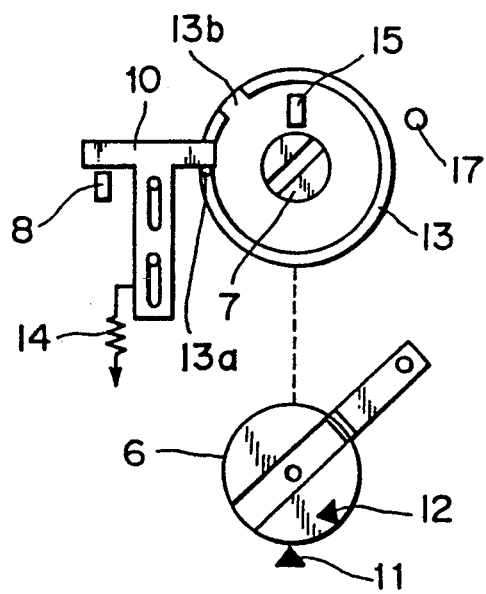
FIG. 6 is an explanatory view showing the operation state of the mechanism of FIG. 3 in which the cartridge has been removed from the cartridge chamber.

The operation of the film rewinding mechanism is described below with reference to FIGS. 4 through 6. When the film rewinding operation has been completed, the rewinding knob 6 stops at a position at which the indicators 11 and 12 align with each other. The mechanism for stopping the rewinding knob 6 is described later with reference to FIGS. 15 through 17. When the film rewinding operation has been completed and the rewinding knob 6 is stopped, the cut-out 13b of the control ring 13 is opposed to the lever 15 mounted on the lower end portion of the arm 9. Accordingly, when the slide button 3 is operated in this state, the lever 15 passes through the cut-out 13b as shown in FIG. 5. Thus, the lever 15 is capable of moving. That is, the slide button 3 can be operated in this state. When the slide button 3 is operated, the lock pin 17 inserted into the cartridge 18 move away therefrom. As a result, the cartridge spool is locked so that it does not rotate. Simultaneously with the passage of the lever 15 through the cut-out 13b, the T-shaped lever 10 follows the movement of the arm 8. Therefore, the lever 10 presses the pin 13a formed on the ring 13. As a result, the lever 10 presses the ring 13 so that the control ring 13 rotates counterclockwise. Since the rotation of the cartridge spool is prevented in this state, the fork 7 engaging the cartridge spool is incapable of rotating. That is, the control ring 13 is not capable of rotating either. When the operation of the slide button 3 is further advanced, the cover 2 is completely opened. As a result, the claw 3a of the slide button 3 is locked by the projection 1a of the camera body 1 as shown in FIG. 3. That is, even though a user takes his/her finger off the slide button 3, the slide button 3 remains at the position. When the cartridge 18 is removed from the cartridge chamber, the cartridge spool moves away from the fork 7 and consequently, the fork 7 is capable of rotating. The pin 13a is pressed by the lever 10. As a result, the fork 7 rotates counterclockwise, thus stopping at a rotational position as shown in FIG. 6. This rotational position coincides with that of the spool of an unused cartridge. When the cover 2 is closed with the unused cartridge installed in the camera body 1, the claw 3a disengages from the projection 1a and the lever 15 rotates about the pin 9a the lever 15, thus passing the ring 13. Thus, the slide button 3 returns to the original position. As described above, the rotational position of the fork 7 is appropriately set when the cover 2 is opened and closed. Therefore, the user has no trouble in resetting the fork 7 in installing the unused cartridge in the cartridge chamber.

Figure 7:
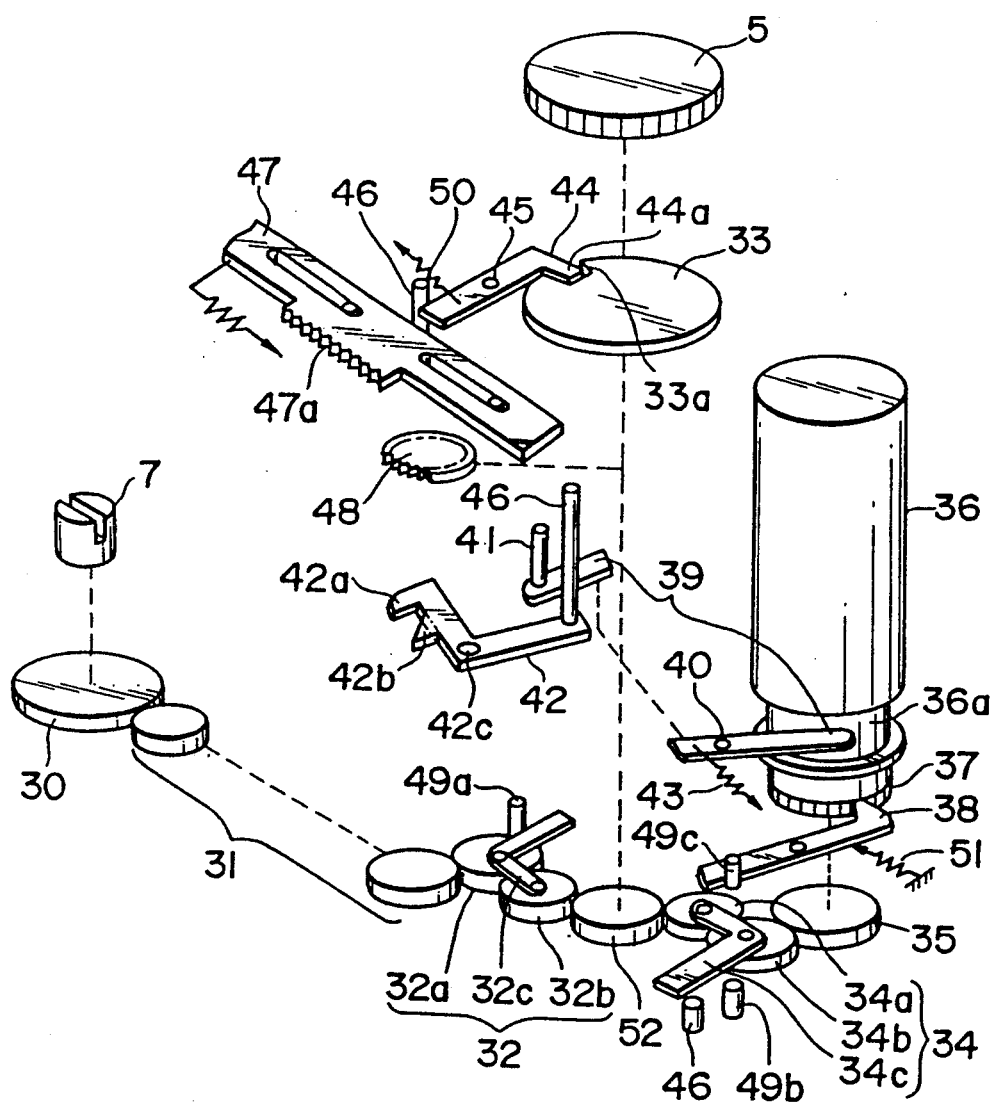
FIG. 7 is a perspective view showing a film winding-/rewinding mechanism of the camera of FIG. 1.

The mechanism for winding and rewinding the film is described below with reference to FIG. 7. For the sake of brevity, the configuration of teeth of each gear and rotational axis thereof fixed to the camera body 1 are omitted in FIG. 7. As shown in FIG. 7, a gear 30 rotating together with the fork 7 is provided below the forks 7. The gear 30 is connected with a gear train 31 connected with a first planetary clutch 32. The first planetary clutch 32 comprises a sun gear 32b, a planetary gear 32a, and a carrier 32c. The sun gear 32b engages an intermediate gear 52. The intermediate gear 52 is connected with a lock disk 33 rotating together with the winding knob 5. As will be described later, the lock disk 33 restricts and stops the rotation of the winding knob 5 each time one frame of the film is wound. Another sun gear 34a engages the intermediate gear 52. A second planetary clutch 34, for a winding A spool 36, comprises the sun gear 34a, a planetary gear 34b, and a carrier 34c. The second planetary clutch 34 is connected with a spool gear 35 capable of engaging the planetary gear 34b and rotating together with the spool 36. There is provided below the spool 36 a mechanism for preventing the reverse rotation of the spool 36 comprising a gear 37 having saw-shaped teeth, a lever 38, and a spring 51. A film detecting lever 39 which changes its position depending on whether or not the film is wound around the spool 36 is rotatably supported by a pin 40 fixed to the camera body 1. The film detecting lever 39 is urged by a spring 43 so that one end thereof presses a small-diameter portion 36a of the spool 36. A pin 41 is formed at the other end thereof. In FIG. 7, the lever 39 is separately shown in FIG. 7 in two portions. One portion is on the side of the pin 41 and the other portion is on the side of the spool 36. An approximately L-shaped perforation detecting lever 42 is mounted on a pin 42c fixed to the camera body 1 so that the lever 42 is rotatable about the pin 42c according to the operation of the pin 41. The lever 42 has claws 42a and 42b formed in correspondence with the positions of two perforations of each frame of the film. As shown in FIG. 14, the lever 42 is urged by a spring 53 so that the claws 42a and 42b press the film surface on a film feeding path. The lever 42 thereby comprises a means for supporting the claws 42a and 42b, and the spring 53 is an urging means for urging the supporting means to an operating position.

A cut-out 33a is formed on the lock disk 33. The leading end 44a of a lock lever 44 engages the cut-out 33a or disengages therefrom with the swivel of the lock lever 44. The lock lever 44 is rotatably supported by a pin 45 fixed to the camera body 1 and urged clockwise by a spring 50. When the lock lever 44 engages the cut-out 33a of the lock disk 33, it prevents the rotation of the lock disk 33. When the lock lever 44 disengages from the cut-out 33a, it permits the rotation of the lock disk 33. With the rotation of the lock disk 33, a shutter plate 47 slides. As a result, a shutter charge gear 48 engaging a rack 47a formed on the shutter plate 47 rotates. The shutter plate 47 is urged toward a pin 46 provided at one end of the perforation detecting lever 42. As shown at a plurality of positions in FIG. 7, the pin 46 acts on the lock lever 44 and the carrier 34c of the second planetary clutch 34.

Figure 8:
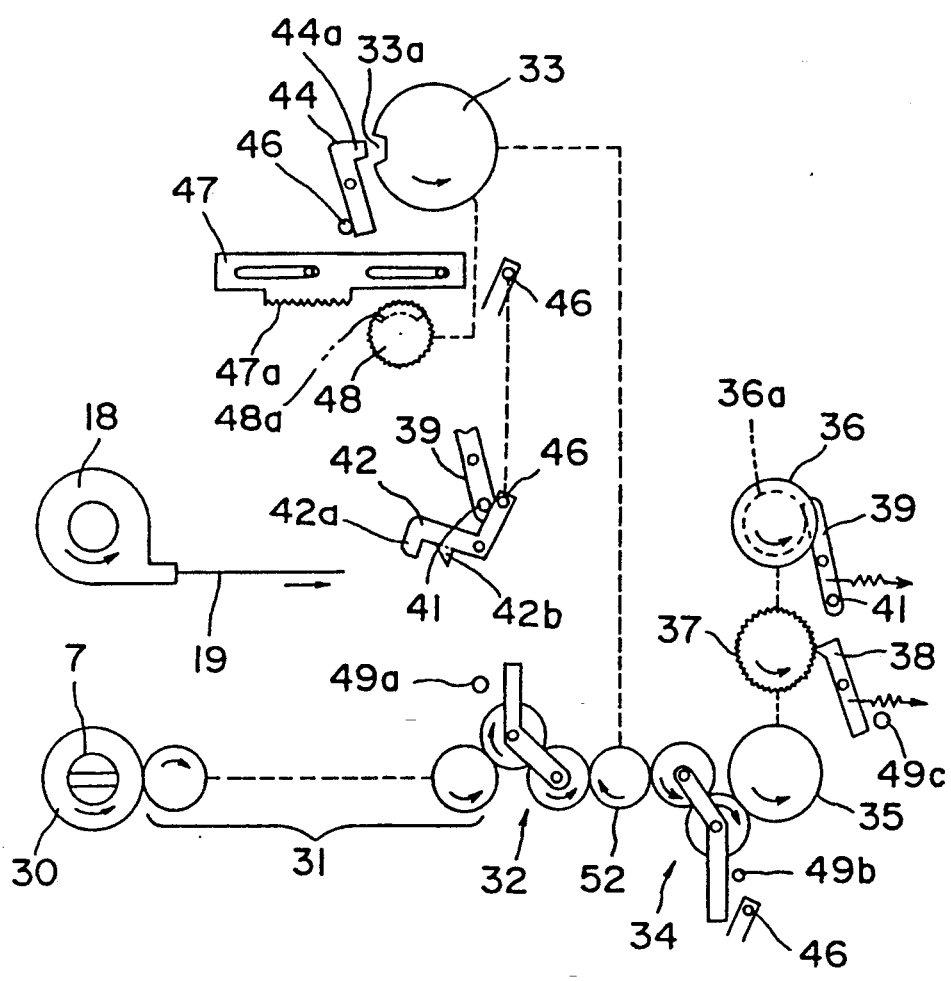
FIG. 8 is an explanatory view showing the operation state of the mechanism of FIG. 7 in which the film is being fed.

The operation of the mechanism for winding and rewinding the film is described below with reference to FIGS. 8 through 13. In these figures, each member of FIG. 7 is shown in plan view and the pins 41 and 46 are shown at a plurality of positions to clarify the operations thereof. FIG. 8 shows the state in which the film 19 is being fed out from the cartridge 18 installed in the cartridge chamber. In this stage, the leading end of the film 19 has not yet wound around the spool 36. Accordingly, the pin 41 of the film detecting lever 39 presses the perforation detecting lever 42, thus swiveling the lever 42 clockwise about the pin 42c. Therefore, the claws 42a and 42b of the lever 42 are away from the feeding path of the film 19. That is, the claws 42a and 42b do not interrupt the film 19 from being fed out from the cartridge 18. The pin 41 on the lever 39 thereby functions as a moving means for moving the claws to a move-away position when the film is not detected at the spool 36. The leading end 44a of the lock lever 44 is in disengagement from the cut-out 33a of the lock disk 33 because the pin 46 of the lever 42 presses the other end of the lock lever 44. The rotation of the winding knob 5 in this state is transmitted to the gear 52 through the lock disk 33, then, to the gear 30 through the first planetary clutch 32 and the gear train 31. As a result, the fork 7 rotates, which feeds out the film 19 from the cartridge 18. The rotation of the gear 52 is transmitted to the spool gear 35 as well through the second planetary clutch 34. Consequently, the spool 36 rotates together with the fork 7. The knob 5, gear 52, clutch 34, gear 35 and spool 36 together constitute a means for feeding the film.

Figure 9:
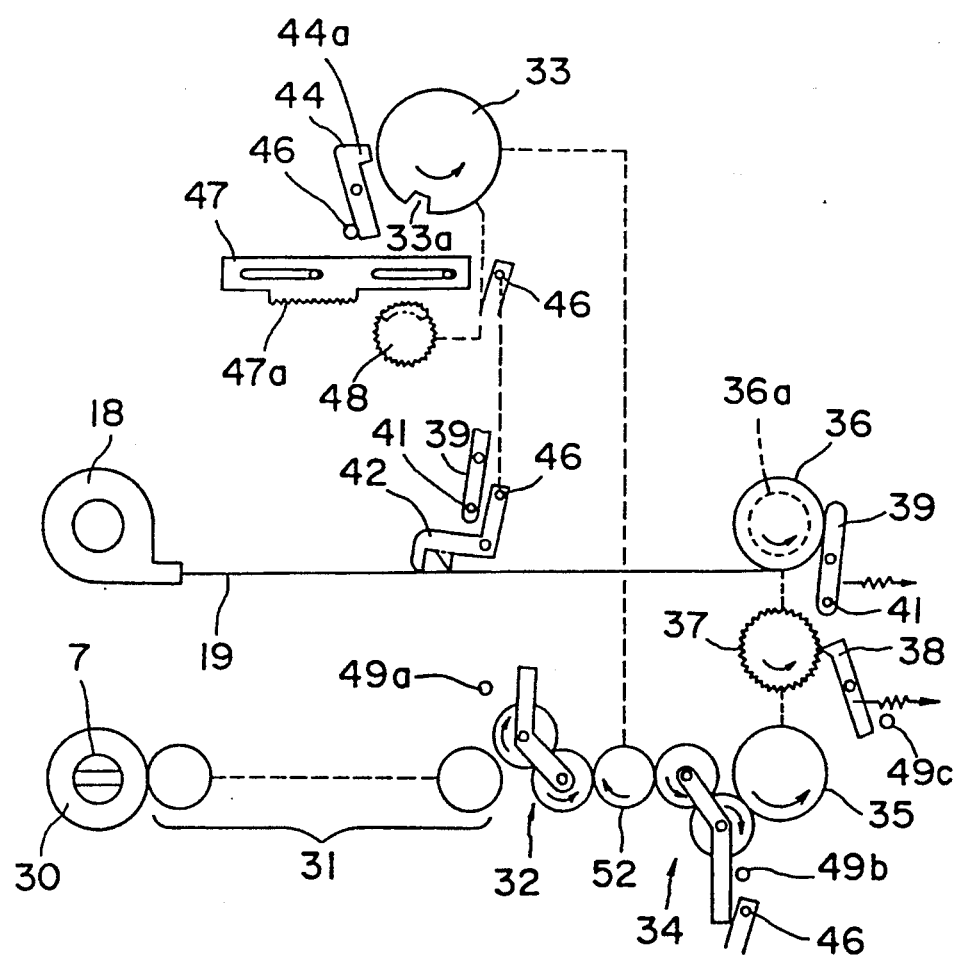
FIG. 9 is an explanatory view showing the operation state of the mechanism of FIG. 7 in which the film has been wound round a spool.
Figure 10:
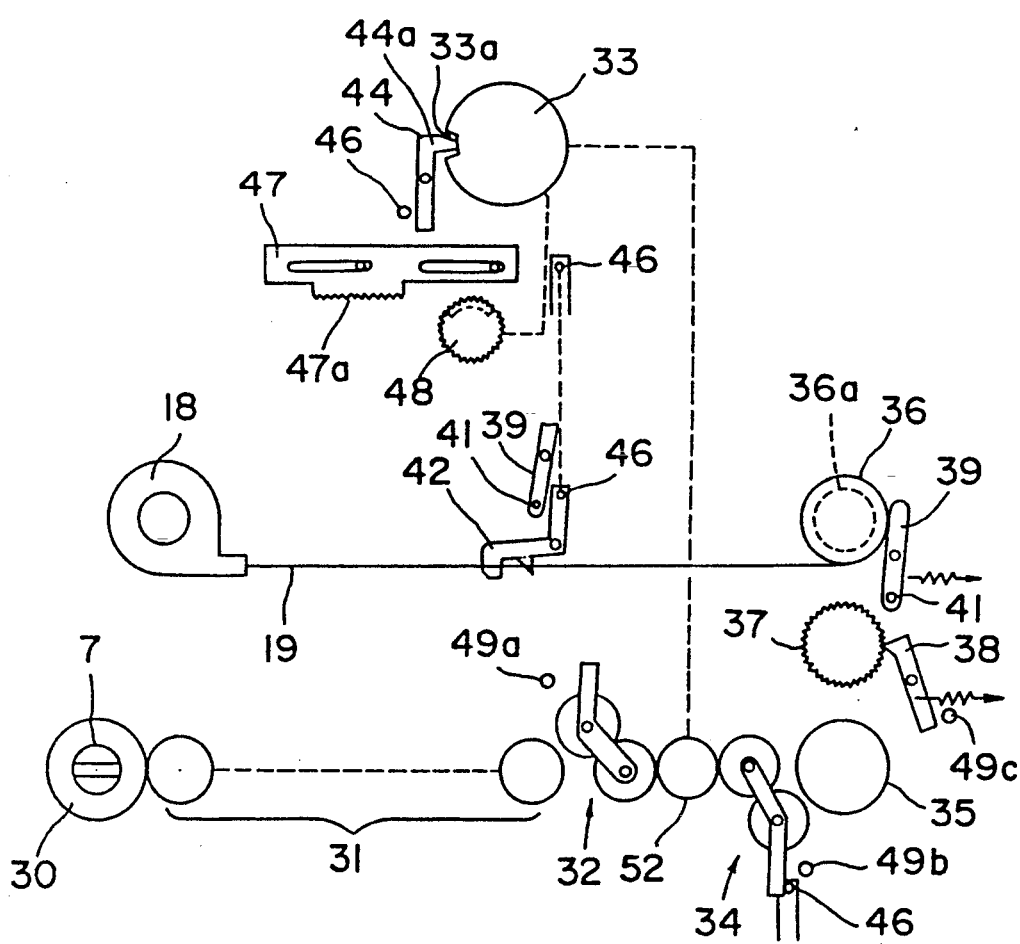
FIG. 10 is an explanatory view showing the operation state of the mechanism of FIG. 7 in which the first frame of the film has been set for taking a photograph.

Upon winding of the leading end of the film 19 around the spool 36 as shown in FIG. 9, the lever 39 swivels and the pin 41 moves away from the lever 42. Accordingly, the lever 42 keeps swiveling until the claws 42a and 42b are brought into contact with the film surface. At this time, the pin 46 of the lever 42 moves a little and consequently, the lock lever 44 swivels clockwise. At this time, the leading end 44a of the lock lever 44 is not in engagement with the cut-out 33a of the lock disk 33. With a further winding of the film 19 around the spool 36, the first planetary clutch 32 is disconnected from the gear train 31 because of the difference in the peripheral speeds between the gears 32a and 32b.

Figure 14A:
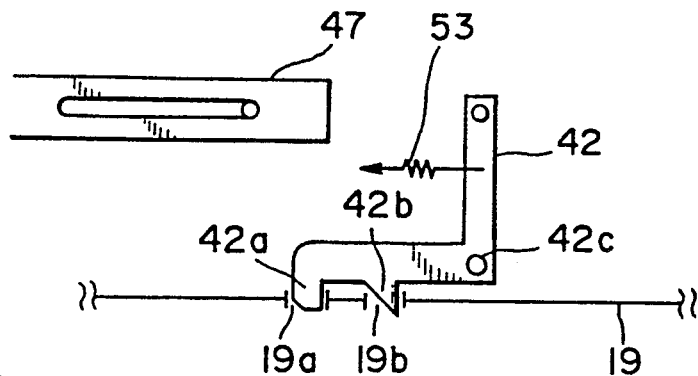
FIGS. 14A through 14D are explanatory views respectively showing the operation state of a perforation detecting lever at the time of shutter charge completion, shutter release completion, and film feeding and shutter charge start, and also in the course of film feeding and shutter charge.

When the first frame of the film 19 has been sent to a predetermined position, the claws 42a and 42b of the lever 42 penetrate into perforations 19a and 19b of the film 19, respectively as shown in FIG. 14A. Then, the pin 46 presses the carrier 34c of the second planetary clutch 34. As a result, the planetary gear 34b moves away from the spool gear 35. Thus, the power transmitting system is cut off by the second planetary clutch 34. As a result, the film feeding operation is stopped. With a further rotation of the winding knob 5, the leading end 44a of the lock lever 44 penetrates into the cut-out 33a of the lock disk 33, thus preventing the rotation of the lock disk 33. Consequently, the rotation of the winding knob 5 is prevented. Thus, the film setting and the shutter charge are completed. The lock disk 33 and lock lever 34 comprises a stopping means for preventing further feeding of the film after it has advanced one frame.

Figure 11:
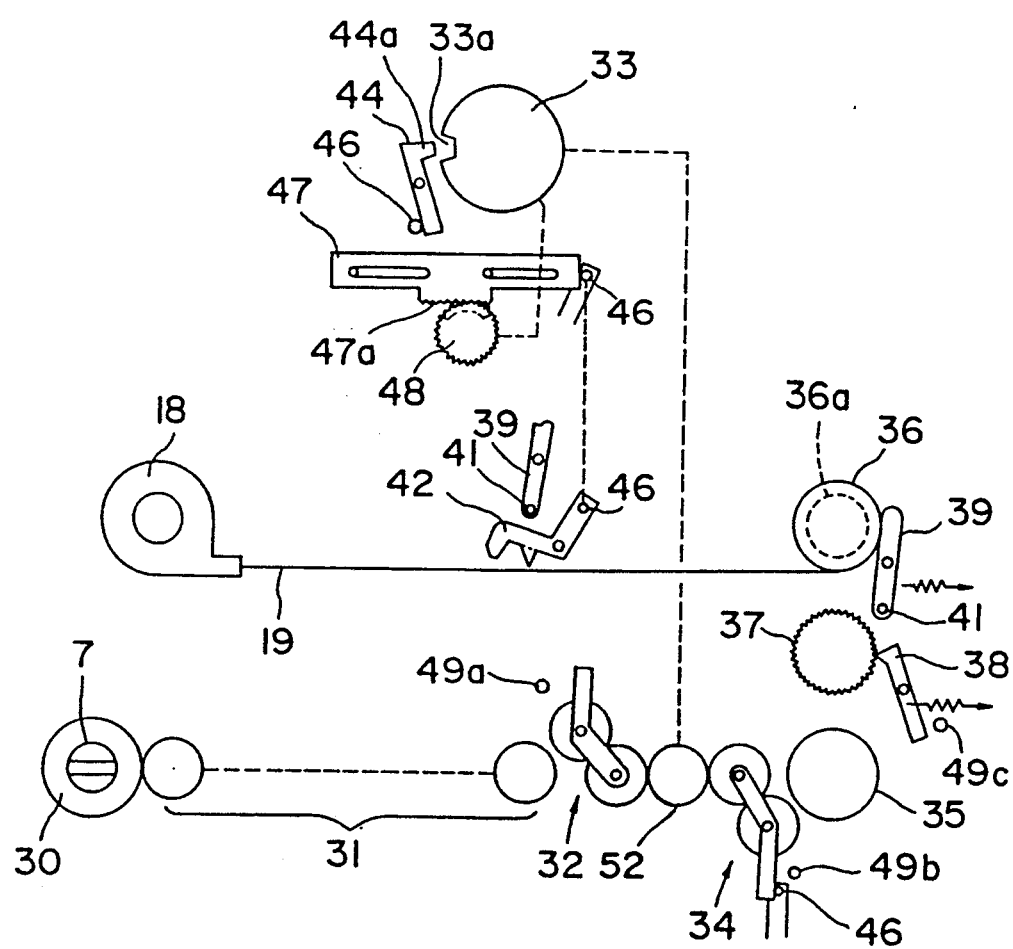
FIG. 11 is an explanatory view showing the operation state of the mechanism of FIG. 7 in which a shutter release has been completed.
Figure 12:
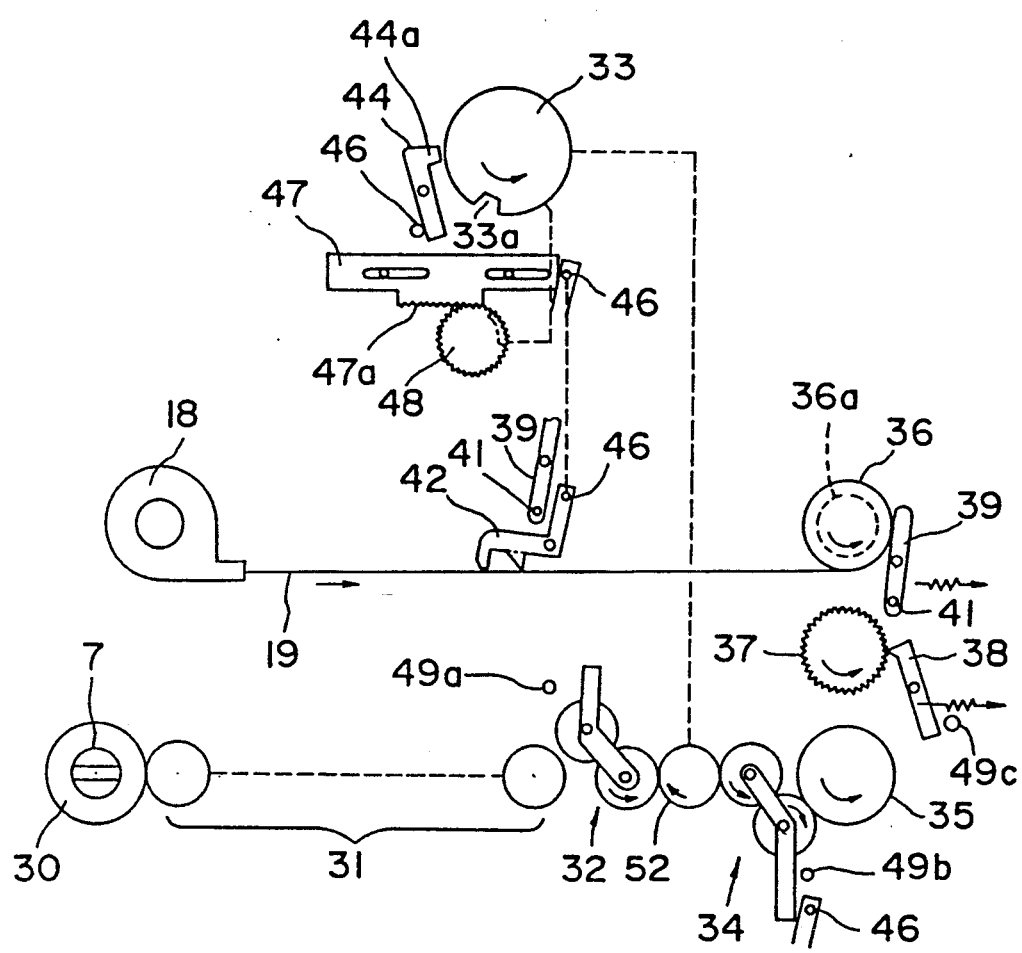
FIG. 12 is an explanatory view showing the operation state of the mechanism of FIG. 7 in which the film is being wound round the spool.
Figure 14B:
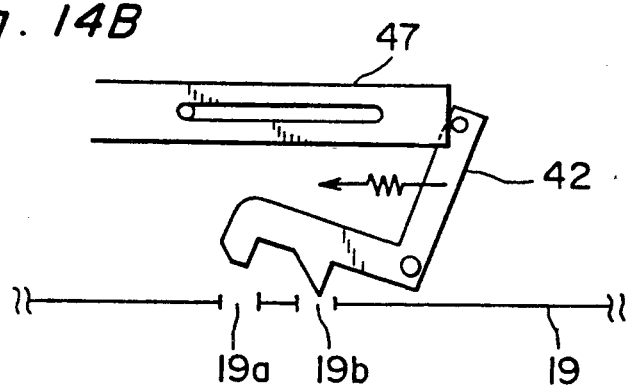
Figure 14C:
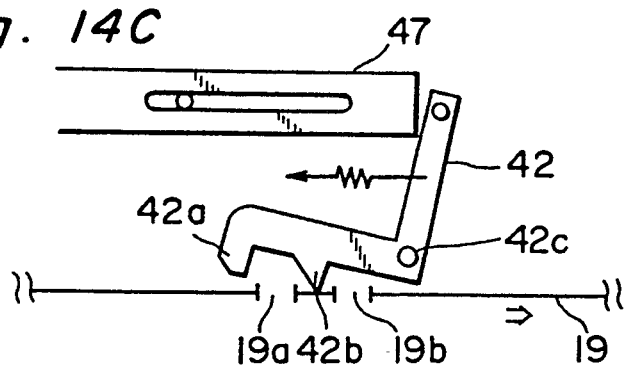
Figure 14D:
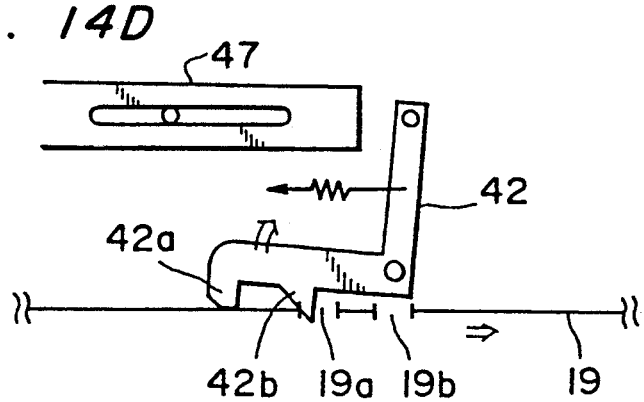

When the shutter is released, the shutter plate 47 presses the pin 46 of the lever 42 as shown in FIGS. 11 and 14B. The shutter plate 47 is urged toward the pin 46 while the shutter plate 47 is prevented from sliding because the rack 47a and the shutter charge gear 48 engage each other. In order to slide the shutter plate 47 when it is prevented from sliding, the shutter charge gear 48 is axially moved to be disengaged from the rack 47a or the rotation transmitting system between the lock disk 33 and the shutter charge gear 48 is cut off by a clutch. When the pin 46 is pressed by the shutter plate 47, the claws 42a and 42b of the lever 42 disengage from the perforations 19a and 19b, respectively and the leading end 44a of the lock lever 44 disengages from the cut-out 33a of the lock disk 33. The shutter plate 47 thereby constitutes a moving means for moving the supporting means 42 to a move-away position. The rotation of the winding knob 5 made in this state is transmitted to the spool 36 and as a result, the film 19 is wound around the spool 36. Simultaneously with the rotation of the winding knob 5, the shutter charge gear 48 rotates and as a result, the shutter plate 47 slides to the left in FIG. 12. Thus, the shutter charge starts. At this time, as shown in FIG. 14C, simultaneously with the move-away of the shutter plate 47 from the pin 46, the film 19 moves to the right in FIG. 14C. As a result, the claw 42b penetrates into the perforation 19a as shown in FIG. 14D. The claw 42b easily disengages from the perforation 19a with the continuous movement of the film 19 to the right because the surface of the claw 42b which contacts the edge of the perforation 19a is tapered as shown in FIG. 14D. The tapered surface of the claw 42b faces upstream with reference to an advance direction of the film, and thereby constitutes an engagement preventing means which prevents the claw 42b from engaging a perforation when the other claw 42a is not also engaging a perforation. Therefore, even though one frame has two perforations, the feeding of the film can be reliably continued frame by frame by a simple construction.

Figure 13:
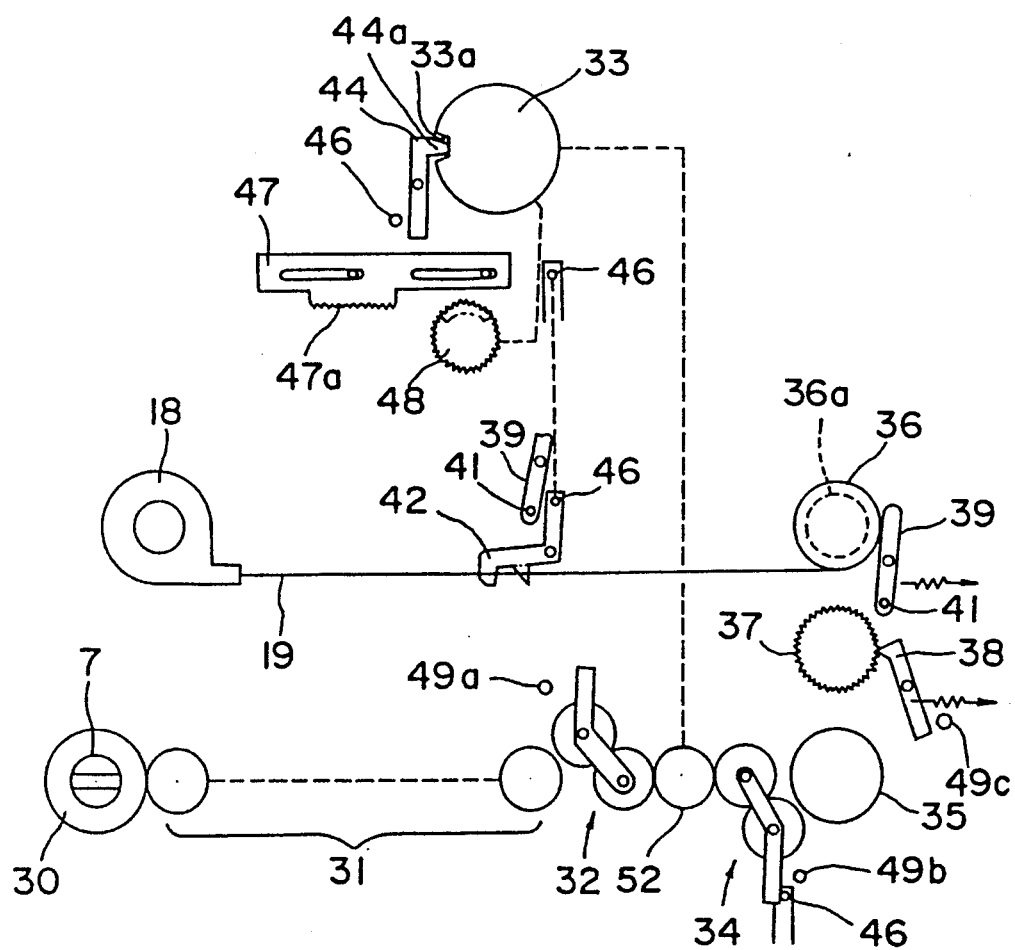
FIG. 13 is an explanatory view showing the operation state of the mechanism of FIG. 7 in which the film has been wound round the spool.

FIG. 13 shows the condition in which film winding operation has been completed. In this case, as described previously with reference to FIG. 10, the film feeding in this case stops when the second planetary clutch 34 is cut off as a result of the penetration of the claws 42a and 42b of the lever 42 into two perforations of the subsequent frame and the cut-off of the second planetary clutch 34 due to the movement of the pin 46. With a rotation of the winding knob 5, the leading end 44a of the lock lever 44 engages the cut-out 33a of the lock disk 33. As a result, the rotation of the winding knob 5 is prevented and thus the film setting and the shutter charge are completed.

Figure 15:
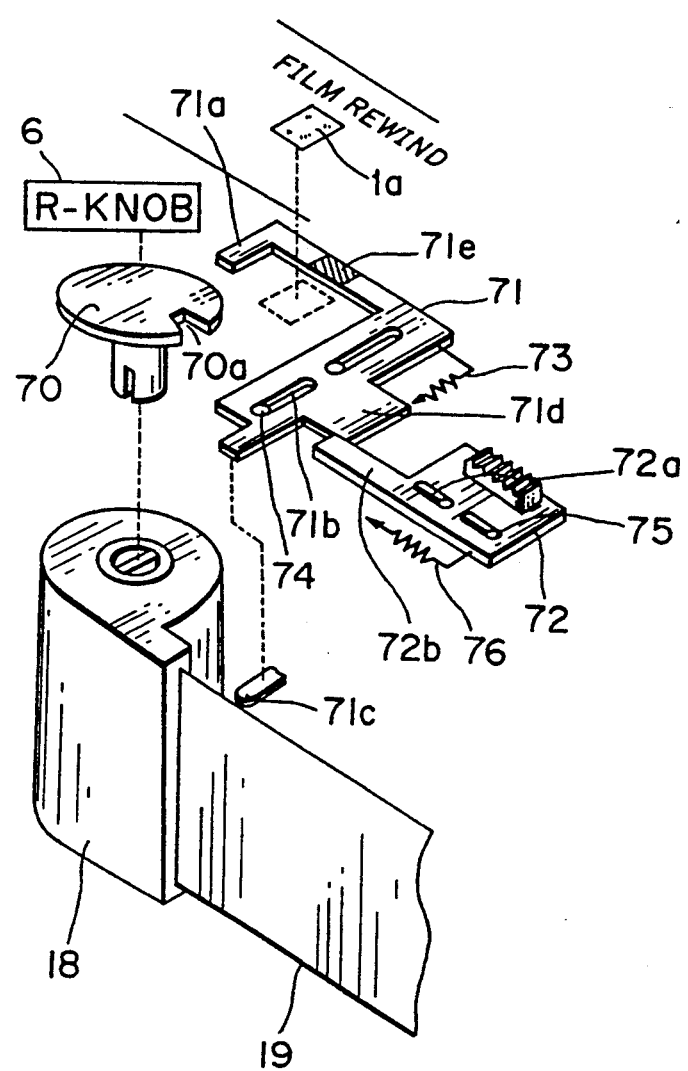
FIG. 15 is a perspective view showing a rewinding stopping mechanism of the camera of FIG. 1.

In rewinding the film 19 after all frames are exposed to light, the gear system connected with the spool 36 and the gear system connected with the fork 7 are disconnected from the winding knob 5 by pins 49a and 49b interlocked with the operation of a lever 72 shown in FIG. 15, for switching winding to rewinding, fixed to the camera body 1 and at the same time, the lever 38 is disengaged from the gear 37 by a pin 49c interlocked with the operation of the lever 72 as well as the pins 49a and 49b, and as a result, the spool 36 is capable of freely rotating independently of the fork 7. The rewinding knob 6 is rotated until the knob 6 is stopped as a result of the operation of the rewinding stopping mechanism which is described below.

Description of the mechanism for stopping the rotation of the rewinding knob 6 when the rewinding operation has been completed and displaying the completion of the film rewinding is made below with reference to FIGS. 15 through 17. The mechanism comprises a control disk 70 engaging the spool of the cartridge 18 and interlocked with the rewinding knob 6; a detecting lever 71 for detecting that the film has been accommodated in the cartridge 18 as a result of the completion of the film rewinding; and the switch-over lever 72 for enabling the detecting lever 71 to be in a detectable state. The detecting lever 71 has an engaging portion 71a which engages a cut-out 70a formed on the control disk 70. The detecting lever 71 is supported by a pin 74 fixed to the camera body 1 so that the detecting lever 71 is movable along a slot 71b. The detecting lever 71 is urged by a spring 73 so that a film detecting portion 71c moves toward the film surface as shown in FIG. 15. A pin 75 fixed to the camera body 1 supports the switch-over lever 72 so that the switch-over lever 72 is movable in the direction along a slot 72a. A spring 76 urges the switch-over lever 72 toward the detecting lever 71. The movable direction of the switch-over lever 72 is perpendicular to that of the detecting lever 71. FIG. 15 shows the state in which the leading end portion 72b of the switch-over lever 72 engages a projection 71d of the detecting lever 71, thus preventing the detecting lever 71 from moving toward the film surface. A display window 1a is formed on the camera body 1 so that a mark 71e displayed on the detecting lever 71 is positioned inside or outside the display window 1a depending on whether or not the film 19 has been rewound into the cartridge 18. Thus, whether or not the film rewinding has been completed is displayed.

In rewinding the film 19, the switch-over lever 72 is moved to disengage the projection 71d of the detecting lever 71 from the leading end portion 72b so that the film detecting portion 71c contacts the film surface. During the film rewinding, the lever 71 does not move because the detecting portion 71c is in contact with the film surface. When the film 19 has been rewound and accommodated in the cartridge 18 as shown in FIG. 16, the detecting lever 71 is not prevented from moving by the film surface. Therefore, while the rewinding knob 6 is being rotated, the engaging portion 71a of the detecting lever 71 penetrates into the cut-out 70a of the control disk 70 as shown in FIG. 17, thereby stopping the rotation of the control disk 70. Thus, the spool of the cartridge 18 does not rotate any more and the rewinding knob 6 always stops at the same position.

Figure 16:
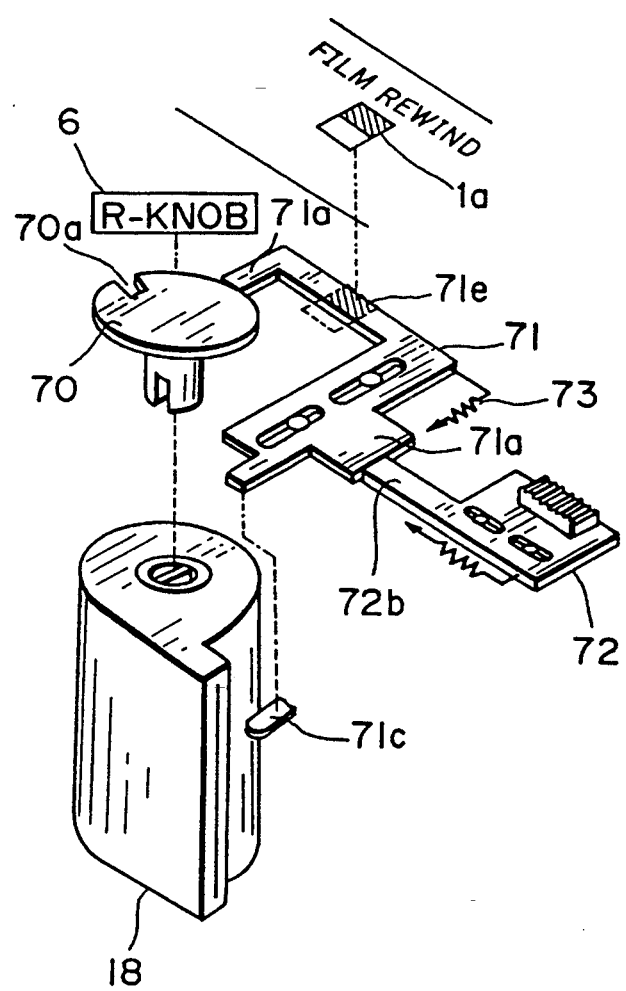
FIG. 16 is a perspective view showing the operation state of the mechanism of FIG. 15 in which the film is being rewound.
Figure 17:
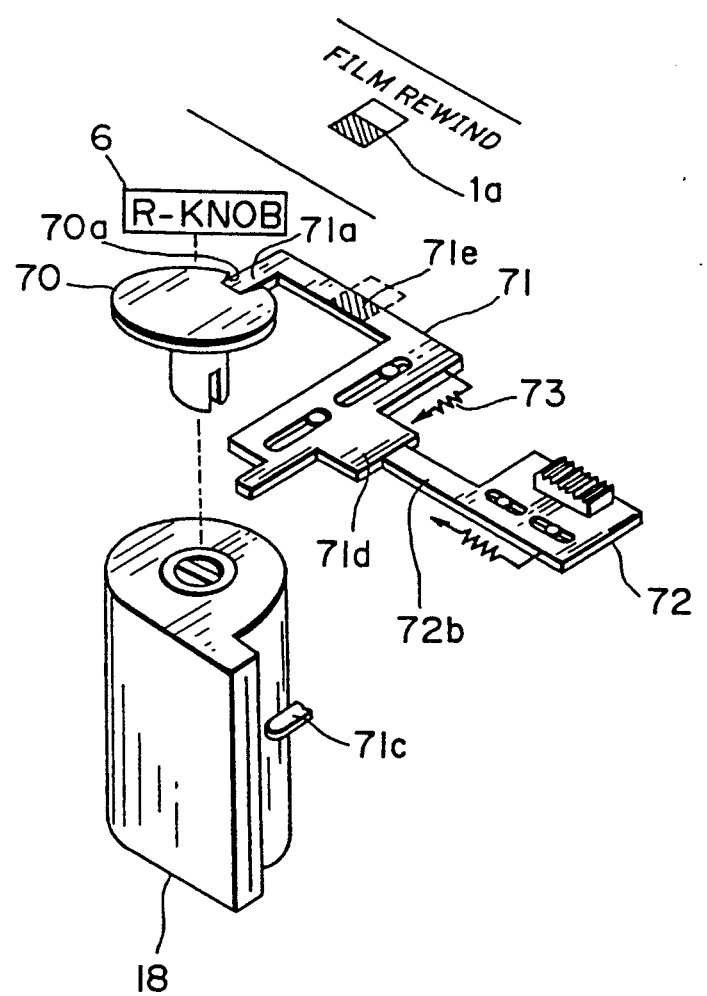
FIG. 17 is a perspective view showing the operation state of the mechanism of FIG. 15 in which the film rewinding has been completed.

During the film rewinding, the mark 71e is displayed in the upper half of the display window 1a as shown in FIG. 16. Upon completion of the film rewinding, the mark 71e is displayed in the lower half of the display window 1a as shown in FIG. 17. Therefore, the user can distinguish whether or not the film 19 has been rewound according to the position of the mark 71e in the display window 1a. Even though the film rewinding operation has been suspended for some reason, the user does not erroneously take out the cartridge 18 from the cartridge chamber of the camera. Although not shown, the detecting lever 71 is interlocked with the cover 2 for installing the cartridge 18 in the cartridge chamber. That is, upon opening of the cover 2, the engaging portion 71a moves in the direction for disengaging the cut-out 70a of the control disk 70 therefrom. Therefore, when the cover 2 is opened, the leading end portion 72b of the switch-over lever 72 engages the projection 71d and the detecting portion 71c moves-away from the film surface. At this time, the mark 71e is not displayed in the display window 1a.

Figure 18A:
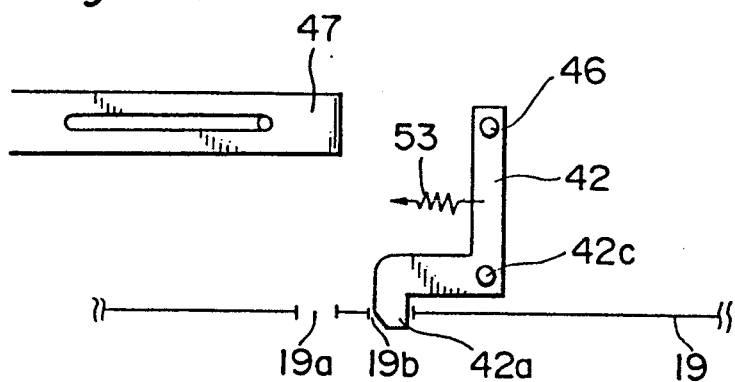
FIGS. 18A through 18D are explanatory views respectively showing the operation state of a perforation detecting lever at the time of shutter charge completion, shutter release completion, and film feeding and shutter charge start, and also in the course of film feeding and shutter charge.
Figure 18B:
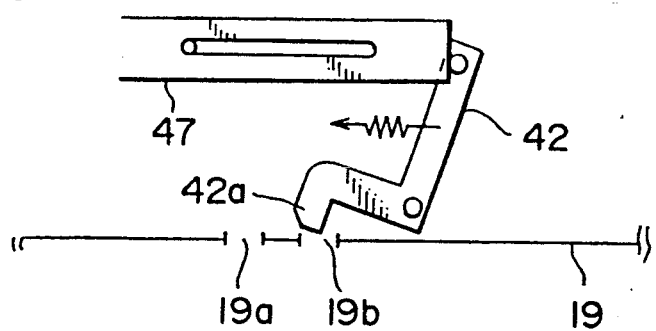
Figure 18C:
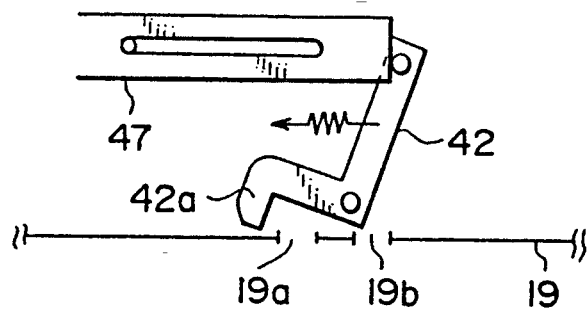
Figure 18D:
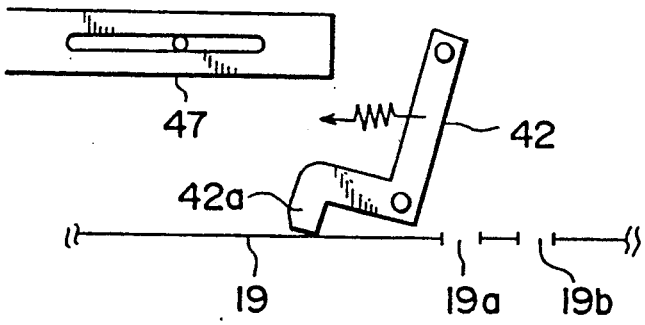

A film feeding apparatus according to a second embodiment of the present invention is described below. The construction of the film feeding apparatus of the second embodiment is similar to that of the first embodiment except that a part of the teeth of the charge gear 48 is cut off as shown by an imaginary line through FIGS. 7 through 13 and the claw 42b is not formed on the perforation detecting lever 42 but only the claw 42a is formed thereon. FIG. 18 shows the operation of the mechanism. FIG. 18A shows that one frame of the feeding of the film 19 and a shutter charge have been completed. When the shutter is released, the shutter plate 47 moves, thus pressing the pin 46. As a result, the claw 42a disengages from the perforation 19b as shown in FIG. 18B. When the winding knob 5 is rotated in this condition, the film 19 is fed as shown in FIG. 18C. But teeth are not partially formed on the charge gear 48, the movement of the shutter plate 47 is delayed by the period of time in which the opening 19a passes the claw 42a as shown in FIG. 18D. Although the construction according to the second embodiment is simple, the timing at which the claw 42a contacts the film surface can be reliably adjusted. Therefore, the film can be reliably stopped each time the film 19 is fed by one frame.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A film feeding apparatus for a film having two perforations each formed at a predetermined position of a frame in correspondence with the exposure plane of each frame, with an interval in a frame between a first perforation and a second perforation being different from an interval between said first perforation of said frame and a second perforation of a succeeding frame, said film feeding apparatus comprising:

a first claw capable of engaging said first perforation;
a second claw capable of engaging said second perforation;
supporting means for supporting said first and second claws so that said first and second claws are movable between an operating position at which said first and second claws are capable of engaging said first and second perforations respectively and a move-away position spaced at a predetermined interval from said operating position;
feeding means for feeding said film;
stopping means for preventing said feeding means from feeding said film by detecting that said film has been fed by one frame due to an engagement of said first claw with said first perforation and that of said second claw with said second perforation;
moving means for moving said supporting means to said move-away position when the feeding of said film starts as a result of the exposure of each frame;
urging means for urging said supporting means to said operating position except when said moving means operates; and
engagement preventing means for preventing said second claw from engaging said first or second perforation when said first claw is not in engagement with said first perforation.

2. A film feeding apparatus as defined in claim 1, wherein said first and second claws are integrated with each other.

3. A film feeding apparatus as defined in claim 2, wherein said engagement preventing means consists of a tapered surface formed on a side surface, of said second claw, facing upstream with reference to an advance direction of said film being fed by said feeding means.

4. A film feeding apparatus as defined in claim 3, wherein said second claw having said engagement preventing means is positioned downstream of said first claw with reference to advance direction of said film.

5. A film feeding apparatus for a film having a first perforation and a second perforation positioned downstream of said first perforation with reference to an advance direction of said film in each frame, the interval between said first perforation and said second perforation of a frame being narrower than the interval between said first perforation of one frame and the second perforation of a succeeding frame, said film feeding apparatus comprising:

a claw capable of engaging said second perforation;
supporting means for supporting said claw so that said claw is movable between an operating position at which said claw is capable of engaging said second perforation and a move-away position spaced at a predetermined interval from said operating position;
feeding means for feeding said film;
stopping means for preventing said feeding means from feeding said film due to the engagement of said claw with said second perforation; and
moving means for moving said claw from said operating position to said move-away position before said feeding means starts feeding said film and moving said claw to said operating position between the time when said first perforation has passed the position of said claw and the time when said second perforation of said succeeding frame reaches the position of said claw while said feeding means is feeding said film.

6. A film feeding apparatus as defined in claim 5, further comprising urging means for urging said claw toward a surface of said film at said operating position so that said claw engages said second perforation.

7. A film feeding apparatus as defined in claim 5, wherein said claw is formed in integration with said supporting means.

8. A film feeding apparatus as defined in claim 5, wherein said moving means moves said claw from said operating position to said move-away position in unison with an operation for exposing each frame of said film.

9. A film feeding apparatus for a film having a first perforation and a second perforation positioned downstream of said first perforation with reference to an advance direction of said film in each frame, the interval between said first perforation and said second perforation of a frame being narrower than the interval between said first perforation of said frame and a second perforation of a succeeding frame, said film feeding apparatus comprising:

a first claw capable of engaging said first perforation;
a second claw capable of engaging said second perforation;
supporting means for supporting said first and second claws so that said first and second claws are movable between an operating position at which said first and second claws are capable of engaging said first and second perforations respectively and a move-away position spaced at a predetermined interval from said operating position;
feeding means for feeding said film;
stopping means for preventing said feeding means from feeding said film by detecting that said film has been fed by one frame due to an engagement of said first claw with said first perforation; and moving means for moving said claws from said operating position to said move-away position before said feeding means starts feeding said film and moving said claws to said operating position between the time when said second perforation has passed the position of said second claw and the time when said first perforation reaches the position of said second claw while said feeding means is feeding said film.

10. A film feeding apparatus as defined in claim 9, further comprising urging means for urging said claws toward a surface of said film at said operating position so that said first and second claws engage said first and second perforations respectively.

11. A film feeding apparatus as defined in claim 9, wherein said claws are formed in integration with said supporting means.

12. A film feeding apparatus as defined in claim 9, wherein said moving means moves said claws from said operating position to said move-away position in unison with an operation for exposing each frame of said film.

* * * * *